United States Patent [19]

Hannaford

[11] 3,760,190

[45] Sept. 18, 1973

[54] NON-CURRENT SUMMING MULTIPLE INPUT LATCHING CIRCUIT

[75] Inventor: Colin William Hannaford, North Poulner, Ringwood, England

[73] Assignee: International Business Machines Corporation, Armonk, N.Y.

[22] Filed: June 29, 1972

[21] Appl. No.: 267,273

[52] U.S. Cl. .................. 307/218, 307/254, 307/289, 330/30 D

[51] Int. Cl. .............................................. H03k 17/00

[58] Field of Search ............................ 330/30 D, 69; 307/218, 254, 296, 289

[56] References Cited

UNITED STATES PATENTS

| | | | |
|---|---|---|---|
| 3,422,283 | 1/1969 | Murray et al. | 307/254 |
| 3,446,989 | 5/1969 | Allen et al. | 307/254 |
| 3,569,848 | 3/1971 | Esteban | 330/30 D |

*Primary Examiner*—John W. Huckert
*Assistant Examiner*—B. P. Davis
*Attorney*—Robert J. Haase et al.

[57] ABSTRACT

A multiple input latching circuit which responds to the satisfaction of any one or more of a plurality of predetermined input signal conditions by the production of an output signal which persists (until reset) irrespective of any subsequent change in the input signals. The latching circuit comprises a plurality of circuit units, each of which includes a current switch which is placed into a predetermined current conduction condition upon the satisfaction of respective input signal conditions. Said conduction condition allows a predetermined fraction of a specified total current to flow through the circuit unit to an output load and, by feedback action, to trigger into conduction a latching current switch which causes all of the specified current to flow directly to said output load. The voltage drop across the output load provides the output signal from the latching circuit.

6 Claims, 2 Drawing Figures

NON-CURRENT SUMMING MULTIPLE INPUT LATCHING CIRCUIT

BACKGROUND OF THE INVENTION

1. Field of the Invention

The present invention generally relates to multiple input logic circuits and, more particularly, to a latching logic circuit of the current switching type.

2. Description of the Prior Art

As is well understood, multiple input latching type circuits provide the function of responding to a temporary set of input signals by producing an output signal that persists until reset despite discontinuance of the input signals. A typical design includes a multiplicity of current switching circuits, each of which provides a current increment to a current summing node when respective input signal conditions are satisfied. Each increment of current by itself is sufficient to produce an output signal and to initiate latching action to maintain the output signal irrespective of subsequent changes in the input signal conditions.

Where large numbers of individual current switching circuits are cascaded and each provides its own increment of current to the aforesaid current summing node, the potential at the current node may be driven beyond acceptable values if the input signal conditions of many switching circuits are satisfied simultaneously. Objectionable voltage levels at the current node may be avoided by the provision of special voltage clamping circuits which are, themselves, objectionable because of the additional power requirements which they impose and because of the extra nodal capacitance which they introduce tending to slow down the operational speed of the overall logic circuit.

SUMMARY OF THE INVENTION

The current summing problem and the attendant need for voltage clamping circuits are avoided by arranging that the first current increment to reach the current node from the first current switching circuit whose input signal conditions are satisfied triggers a latching current switching circuit. The latching circuit turns off all of the other current switching circuits (including the one which provided the first current increment) and simultaneously replaces the first current increment with a predetermined current value at the current node. Thus, the same predetermined value of current is applied to the current node independent of how many current switching circuits experience input signal condition satisfaction. The predetermined current value stabilizes the voltage level at the current node and eliminates the need for voltage clamping circuits.

DESCRIPTION OF THE PREFERRED EMBODIMENT

Figure 1:
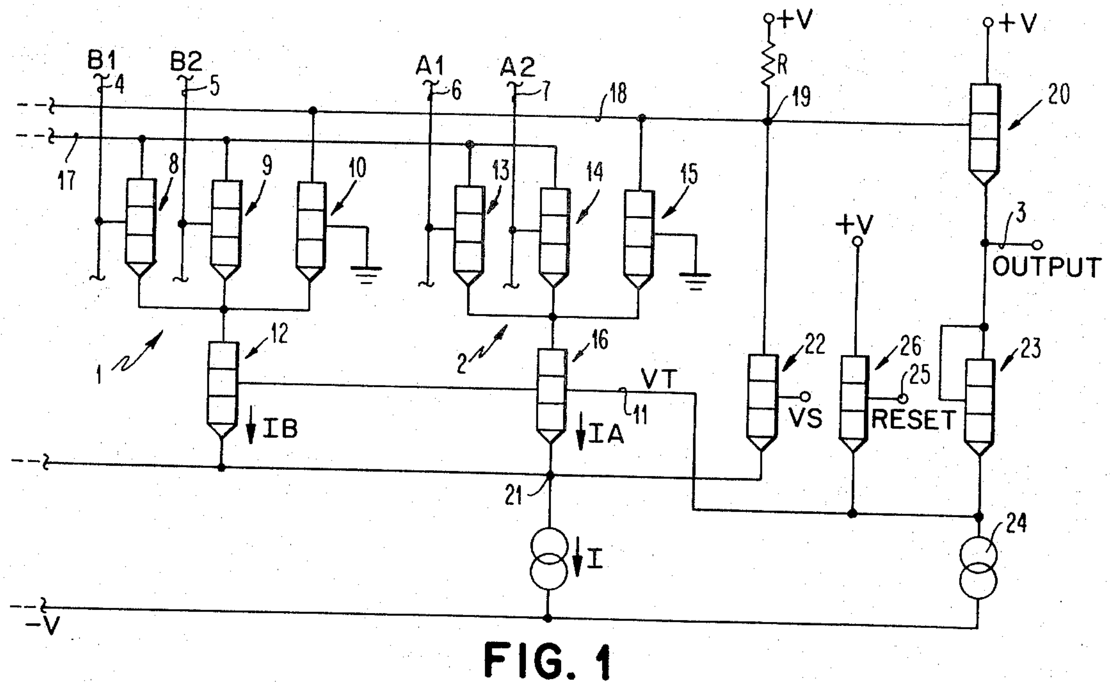
FIG. 1 is a simplified schematic diagram of a preferred embodiment of the present invention adapted to respond to a wide range of different input signal conditions.

Referring to FIG. 1, current switching networks 1 and 2 are representative of a generally larger number of current switching circuits that may be cascaded for providing a joint output signal at output 3 in response to the satisfaction of predetermined signal conditions at any one or more of paired signal inputs 4 and 5 or inputs 6 and 7. Each current switch comprises four transistors such as transistors 8, 9, 10 and 12 of typical switch 1 whose conduction or nonconduction are determined by the signals applied to the bases of transistors 8 and 9 via lines 4 and 5 and also by the signal applied to line 11 which is connected to the base of transistor 12 in series circuit with each of transistors 8, 9 and 10. The emitters of transistors 8, 9 and 10 are commonly connected. Transistors 13, 14, 15 and 16 comprising current switching circuit 2 are similarly connected and respond to signals at inputs 6 and 7 as well as to the signal on line 11. Appropriate collector bias potentials are applied to transistors 8, 9, 13 and 14 via line 17. The collector potential for transistors 10 and 15 is supplied by the potential source designated +V via resistor R and line 18. A current source designated I is connected between the emitters of transistors 12 and 16 and a suitable source of negative potential designated −V.

In the operation of the circuit so far described, a positive output voltage is provided at output 3 in the presence of a positive voltage at either or both of inputs 4 and 5 or at either or both of inputs 6 and 7. For example, if both inputs 4 and 5 are positive, and transistor 12 is rendered conductive by the signal on line 11, a portion $I_B$ of current from source I flows through transistor 12 and jointly through transistors 8 and 9 to line 17 bypassing current node 19. Node 19 remains bypassed so long as either input 4 or 5 is positive allowing at least one of transistors 8 and 9 to remain conductive. Only in the case where inputs 4 and 5 are both negative, are transistors 8 and 9 cut off thereby switching current $I_B$ through transistor 10 to node 19. The current at node 19 flows through resistor R causing the base potential at emitter follower 20 to fall producing a negative signal potential at output 3.

It will be observed that the current from generator I divides at junction 21 substantially equally between each of the cascaded current switching circuits such as exemplary circuits 1 and 2. The current entering a given current switching circuit flows out via line 17 (in the event that either or both input signals are positive) or along line 18 (in the event that both input signals are negative). Accordingly, the amount of current reaching node 19 ordinarily would be determined by the number of current switching circuits which simultaneously receive negative input signals at both signal inputs. In the absence of any special circuit provision, the potential at node 19 would fall in direct relationship with the number of current switching circuits receiving negative input signal pairs. Successive reductions in potential at node 19 would cause saturation of conducting transistors 10 and 15 and all other corresponding transistors in the additional current switching circuits (not shown). Transistor saturation, of course, objectionably reduces the speed of operation of the overall logic circuit of FIG. 1. The saturation problem could be alleviated by providing the voltage clamping circuit (not shown) at node 19 but such a clamping circuit would introduce objectionable extra nodal capacitance and require an additional reference voltage supply.

The current saturation problem is avoided without resort to voltage clamping circuits at node 19 and without the attendant increase in operational speed due to extra nodal capacitance by the provision of a latching current switching circuit comprising transistor 22 in combination with each of the transistors of the current switching circuits corresponding to transistors 12 and 16. The emitter of transistor 22 is commonly connected to the emitters of transistors 12 and 16 and the collector of transistor 22 is connected to node 19. Output 3 is connected by load 23 and current source 24 to the negative voltage source designated −V. Line 11 is connected to the junction between load 23 and source 24. The negative voltage at output 3 is reduced by the fractional volt drop across diode-connected transistor load 23 and applied via line 11 simultaneously to all of the transistors of the current switching circuits corresponding to transistors 12 and 16 of switching circuits 1 and 2. The negative voltage cuts off all such transistors including transistors 12 and 16 and diverts the total current from source I through transistor 22 to node 19.

It should be noted that the full current from source I is rerouted to node 19 upon the conduction of transistor 22 irrespective of the manner in which the current from source I previously had been divided between the current switching circuits, all of which are turned off upon the conduction of transistor 22. Transistor 22 continues to conduct until a positive reset pulse is applied to terminal 25 turning on reset transistor 26 and raising the potential of line 11 to a value above the value $V_s$ at the base of transistor 22 thereby turning on transistors 12 and 16 and cutting off latching transistor 22. Thus reset, the circuit of FIG. 1 is prepared for the application of a new set of input signals at inputs 4, 5, 6, 7, etc.

Figure 2:
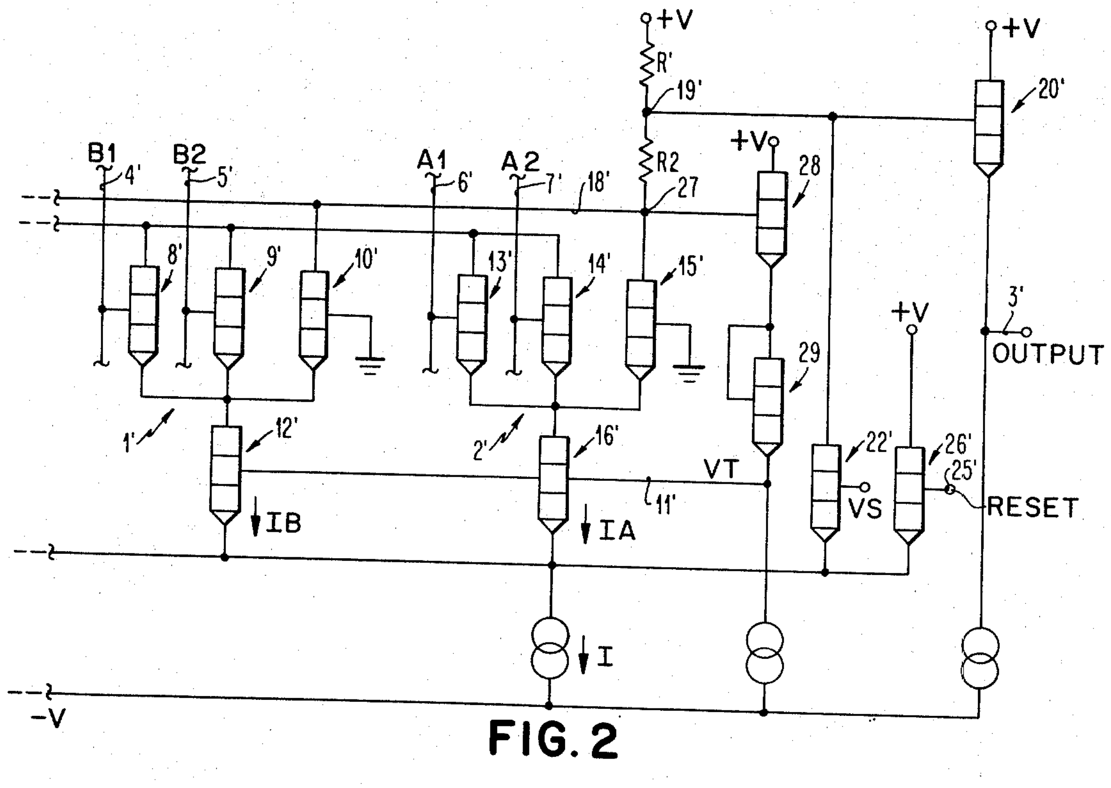
FIG. 2 is a simplified schematic diagram of a modification of the embodiment of FIG. 1 adapted to respond to a significantly larger range of different input signal conditions.

As previously mentioned, the total current from source I divides substantially equally between each of the current switching circuits such as circuits 1 and 2. The larger the number of current switching circuits employed in the overall circuit of FIG. 1, the smaller the portion of hte total current from source I that flows through a given current switching circuit to line 18 and the smaller the potential drop at node 19 corresponding thereto. It is necessary, of course, that the current increment flowing to node 19 from a single current switching circuit be sufficient to reduce the signal at output 3 and on feedback line 11 to a value below the value $V_s$ at the base of latching transistor 22 so that all of the transistors corresponding to transistors 12 and 16 are cut off and transistor 22 is rendered conductive. The modifications shown in FIG. 2 relaxes the problem of assuring that the current increment from a single current switching circuit is sufficient to initiate latching action for a significantly extended number of cascaded current switching circuits. Basically, the technique employed in FIG. 2 is to increase the voltage decrement brought about by the conduction of a single current switching circuit which is fed back via line 11 while maintaining the same output voltage swings as in FIG. 1. This is accomplished by providing two separate circuits for providing the output voltage and for providing the feedback latching voltage, respectively. The circuit for providing the output voltage is substantially unchanged in FIG. 2 with respect to FIG. 1. An auxiliary circuit is included in FIG. 2 for providing the feedback latching voltage.

The components of FIG. 2 corresponding to the components of FIG. 1 are identified by the same reference numerals primed. The operation is essentially the same with respect to the production of a signal at output 3' in response to input signals applied to inputs 4', 5', 6' and 7'. For example, assuming that inputs 4' and 5' are both negative, the current portion $I_B$ of current I is diverted through transistor 10', line 18' and resistor R2 to node 19'. The added resistor R2 does not change the potential at node 19' in response to the current $I_B$ whereby the output signal at 3' of FIG. 2 is the same as the output voltage at 3 of FIG. 1. The feedback voltage on line 11' of FIG. 2, however, is increased (in a negative direction) with respect to the feedback voltage on line 11 of FIG. 1 as a result of the introduction of added resistor R2. The potential at junction 27 is reduced relative to the potential at node 19' in accordance with the voltage drop produced across resistor R2 by current $I_B$. The increased voltage decrement is fed back via emitter follower 28 and load 29 (functionally corresponding to emitter follower 20 and load 23 of FIG. 1) and applied to feedback line 11' of FIG. 2. In this manner, the voltage swings at output 3' of FIG. 2 are unchanged with respect to the voltage swings at output 3 of FIG. 1 but the amplitude of the feedback latching voltage applied via line 11' to cut off transistors 12' and 16' and to render conductive latching transistors 22' is increased in the modified arrangement of FIG. 2 for a given current $I_B$. The increased feedback latching voltage in FIG. 2 allows for a significant increase in the number of cascaded current switching networks such as networks 1' and 2' with respect to the number of cascaded networks useable in FIG. 1 without impairing the latching sensitivity of the overall circuit of FIG. 2. During RESET, transistor 26' is turned on, turning off latching transistor 22' and raising the potential at node 19' and junction 27. The raised potential is coupled by emitter follower 28 and load 29 to line 11', permitting transistor 12' and 16' to turn on as soon as the reset pulse is terminated at 25'.

While this invention has been particularly described with reference to the preferred embodiments thereof, it will be understood by those skilled in the art that the foregoing and other changes in form and details may be made therein without departing from the spirit and scope of the invention.

What is claimed is:

1. A multiple input latching circuit comprising:
a plurality of circuit units connected in cascade,
each said unit providing a respective portion of a total current along a first path upon satisfaction of predetermined respective input signal conditions and along a second path if said conditions are not satisfied,
each said first path connecting to a current node,
a first impedance element connecting said node to a source of voltage, and
an actuatable latching current switch connected to each said unit and responsive to the current flowing into said current node for blocking when actuated the conduction of each said circuit unit and for applying said total current to said current node.

2. The circuit defined in claim 1 and further including:
a second impedance element,
said second impedance element being connected in series circuit between each said first path and said current node.

3. The circuit defined in claim 1 wherein the voltage at said current node is applied to said latching current switch for actuating said latching current switch.

4. The circuit defined in claim 2 wherein the voltage at the junction between said second impedance element and each said first path is applied to said latching current switch for actuating said latching current switch.

5. The circuit as defined in claim 3 and further including an output terminal, and means for coupling the voltage at said current node to said output terminal.

6. The circuit defined in claim 4 and further including an output terminal, and means for coupling the voltage at said current node to said output terminal.

* * * * *